United States Patent
Knutson et al.

(10) Patent No.: US 7,769,162 B2
(45) Date of Patent: Aug. 3, 2010

(54) ACOUSTIC ECHO CANCELLER WITH MULTIMEDIA TRAINING SIGNAL

(75) Inventors: Paul Gothard Knutson, Princeton, NJ (US); Andreas Matthias Aust, Princeton, NJ (US); Snigdha Verma, Somerset, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 88 days.

(21) Appl. No.: 10/590,893

(22) PCT Filed: Mar. 5, 2004

(86) PCT No.: PCT/US2004/006803

§ 371 (c)(1),
(2), (4) Date: Aug. 28, 2006

(87) PCT Pub. No.: WO2005/099231

PCT Pub. Date: Oct. 20, 2005

(65) Prior Publication Data

US 2007/0189508 A1 Aug. 16, 2007

(51) Int. Cl.
*H04M 9/08* (2006.01)
(52) U.S. Cl. .................................. 379/406.01
(58) Field of Classification Search ............ 379/406.01
See application file for complete search history.

(56) References Cited

U.S. PATENT DOCUMENTS

| 5,400,399 | A | | 3/1995 | Umemoto et al. | |
|---|---|---|---|---|---|
| 5,553,137 | A | * | 9/1996 | Nyhart et al. | 379/406.06 |
| 5,721,772 | A | | 2/1998 | Haneda et al. | |
| 5,991,640 | A | | 11/1999 | Lilja et al. | |
| 6,081,593 | A | | 6/2000 | Kim | |

FOREIGN PATENT DOCUMENTS

| EP | 0917365 A2 | 5/1999 |
|---|---|---|
| GB | 2342832 | 4/2000 |
| JP | 01050655 A | 2/1989 |
| JP | 8335976 A | 12/1996 |
| JP | 2003249996 A | 9/2003 |

OTHER PUBLICATIONS

Supplementary European Search Report dated Apr. 14, 2009.
European Search Report, for PCT/US04/06803, Dated Jul. 19, 2004.

* cited by examiner

*Primary Examiner*—Alexander Jamal
(74) *Attorney, Agent, or Firm*—Robert D. Shedd; Joseph J. Opalach; Catherine A. Cooper

(57) ABSTRACT

In an electronic device having an acoustic echo canceller and being capable of implementing audio applications and at least one of a conferencing application and a telephony application, there is provided a background training method for the acoustic echo canceller. The method includes the step of utilizing sound that corresponds to a non-training audio application to train the acoustic echo canceller.

27 Claims, 7 Drawing Sheets

FIG 3A
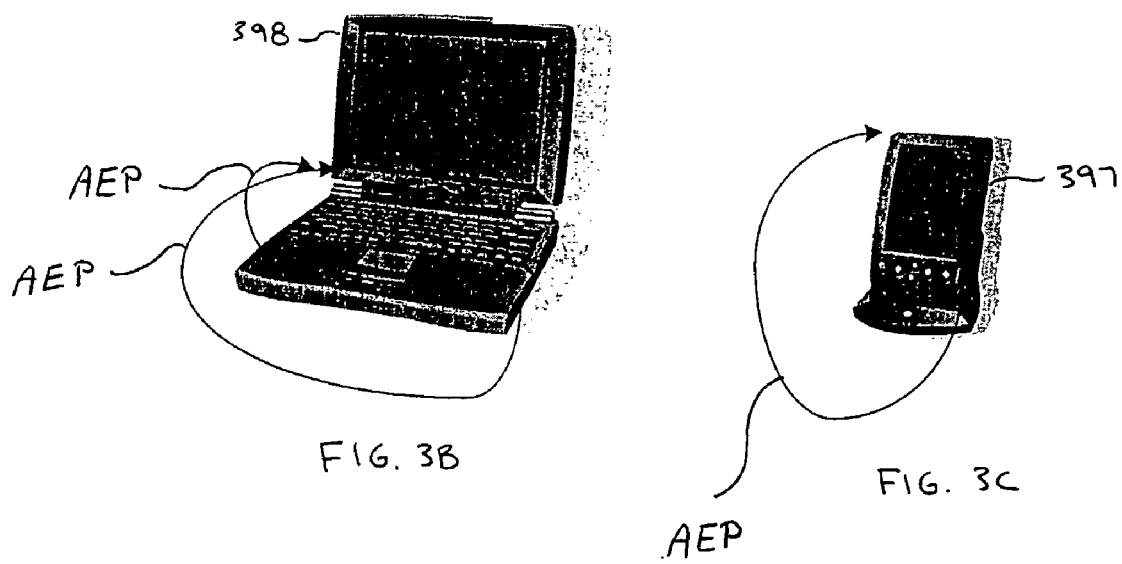
FIG. 3B
FIG. 3C

ACOUSTIC ECHO CANCELLER WITH MULTIMEDIA TRAINING SIGNAL

This application claims the benefit, under 35 U.S.C. §365 of International Application PCT/US2004/006803, filed Mar. 5, 2004 which was published in accordance with PCT Article 21(2) on Oct. 20, 2005 in English.

BACKGROUND OF THE INVENTION

1. Field of the Invention

The present invention generally relates to acoustic echo cancellers and, more particularly, to a background training method for conferencing or telephony acoustic echo cancellers.

2. Background of the Invention

An acoustic echo is an undesirable condition that results from sound that emanates from a speaker being fed back into a microphone. To reduce or eliminate such echo, an acoustic echo canceller is employed. However, for the acoustic echo canceller to be effective, it has to be trained.

Unfortunately, a key problem with acoustic echo cancellers is that during the training period itself, an acoustic echo is present. To minimize this echo, one can use a training signal, but this subjects the user to an annoying sound (e.g., high energy, full bandwidth). Alternately, one can start with the set of coefficients from the last operation of the echo canceller, but if the acoustic environment changed, the stored coefficients will be invalid or possibly worse than starting from a zero coefficient point. The coefficients correspond to an adaptive filter included in the acoustic echo canceller. The adaptive filter functions to adapt the acoustic echo canceller to the environment in which it is employed.

A more complicated approach to minimizing the echo period involves temporarily muting a return channel when a remote user at a remote station is speaking, and allowing the echo canceller to train during this time. However, this approach disadvantageously reduces the system to half-duplex communication during training. Another approach involves reducing the local speaker volume when a local user is speaking into the microphone so as to reduce the canceling requirements of the adaptive filter.

Accordingly, it would be desirable and highly advantageous to have a background training method for an echo canceller that overcomes the above-described problems of the prior art.

SUMMARY OF THE INVENTION

The problems stated above, as well as other related problems of the prior art, are solved by the present invention, a background training method for a conferencing or telephony echo canceller. The present invention is provided on a device capable of implementing conferencing (including videoconferencing and teleconferencing) and/or telephony (including Internet Protocol (IP) telephony) applications as well as audio applications, such that the audio applications are used to train the echo canceller in the background. Further, a pre-specified audio sequence that includes all the frequencies necessary to train the echo canceller can be used as an "incoming call" notification, as a reminder that a scheduled conference call is about to take place, and so forth.

According to an aspect of the present invention, in an electronic device having an acoustic echo canceller and being capable of implementing audio applications and at least one of a conferencing application and a telephony application, there is provided a background training method for the acoustic echo canceller. The method includes the step of utilizing sound that corresponds to a non-training audio application to train the acoustic echo canceller.

According to another aspect of the present invention, there is provided an acoustic echo canceller for use in an electronic device that is capable of implementing audio applications and at least one of a conferencing application and a telephony application. The acoustic echo canceller includes an adaptive filter adapted to be trained using sound that corresponds to a non-training audio application.

According to yet another aspect of the present invention, there is provided a background training method for an acoustic echo canceller included in a peripheral device. The peripheral device is capable of implementing audio applications and further includes at least one of a Universal Serial Bus (USB) interface and a IEEE 1394 interface for connecting to a computer capable of implementing at least one of a conferencing application and a telephony application. The method includes the step of receiving sound from the computer via at least one of the USB interface and the IEEE 1394 interface. The sound corresponds to a non-training audio application. The method further includes the steps of utilizing the sound that corresponds to the non-training audio application to train the acoustic echo canceller in the peripheral device, and performing echo canceling, during at least one of the conferencing application and the telephony application implemented by the computer, using the acoustic echo canceller in the peripheral device.

These and other aspects, features and advantages of the present invention will become apparent from the following detailed description of preferred embodiments, which is to be read in connection with the accompanying drawings.

BRIEF DESCRIPTION OF THE DRAWINGS

FIGS. 3A, 3B, and 3C are diagrams illustrating acoustic echo paths 320 relating to the feedback of a speaker output to a microphone input in a personal computer 399, a mobile computer 398 (e.g., laptop), and a Personal Digital Assistant (PDA) 397, respectively;

DETAILED DESCRIPTION OF THE INVENTION

Figure 1:
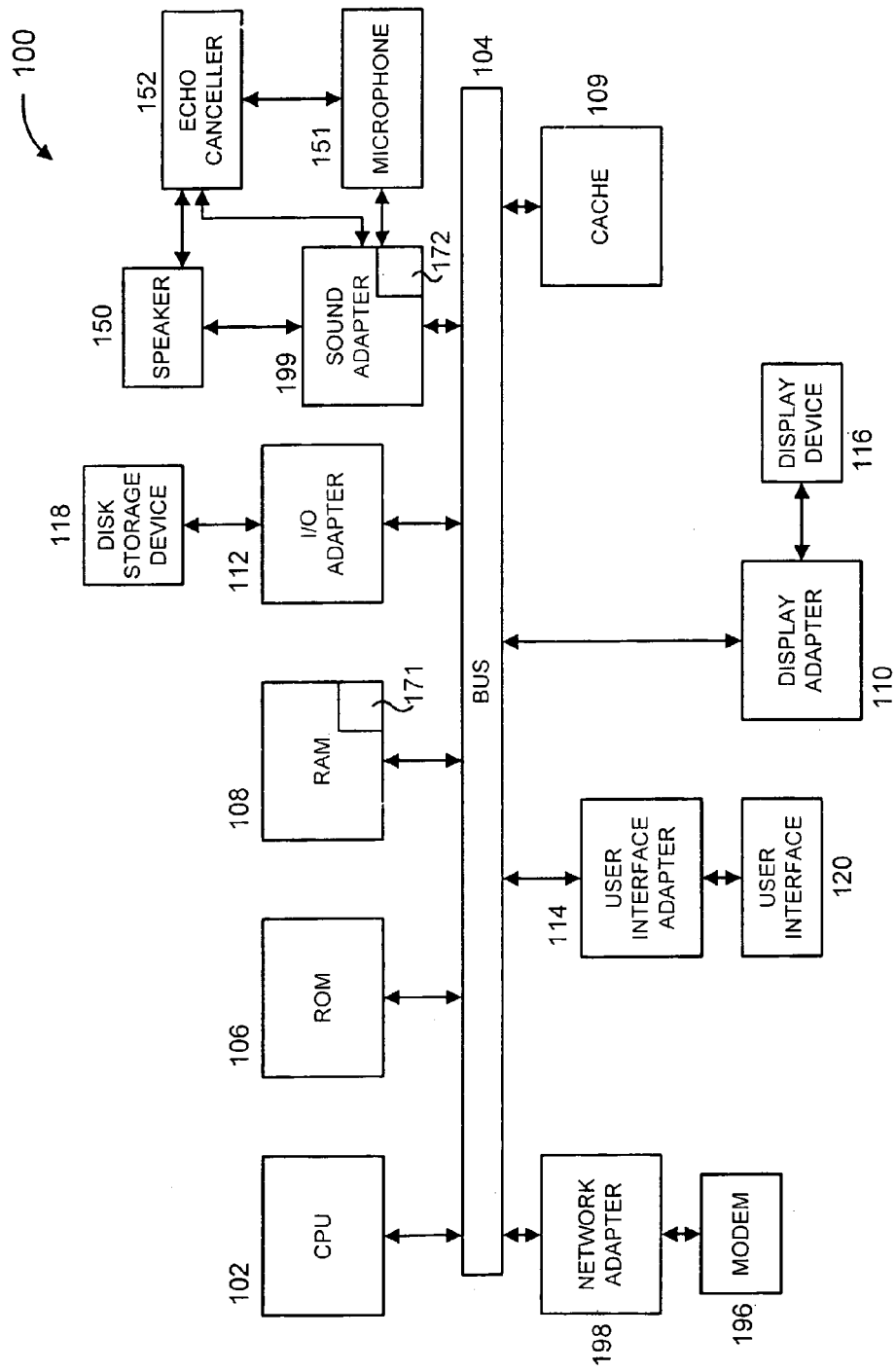
FIG. 1 is a block diagram illustrating an electronic device 100 to which the present invention may be applied, according to an illustrative embodiment of the present invention.

The present invention is directed to a background training method for a conferencing (including teleconferencing and videoconferencing) or telephony (including Internet Protocol (IP) telephony) acoustic echo canceller. The present invention is provided on a device that is capable of implementing conferencing or telephony applications and that is also capable of implementing audio applications. It is to be appreciated that the device on which the present invention is implemented need only be capable of one of conferencing or telephony, but may be capable of both. However, it is to be further appreciated that as used herein, the phrase "video conferencing" refers to conferencing applications that include both video and audio. Advantageously, the present invention is capable of providing continuous training for an acoustic echo canceller, by allowing the audio applications to be used to train the acoustic echo canceller. That is, the acoustic echo canceller is trained during the use of audio applications, by using the audio output of the audio applications. Further, a pre-specified audio sequence that includes all the necessary frequencies to train the echo canceller or some other sound can be used as an incoming call or e-mail notification, as a reminder that a scheduled conference call or meeting is about to take place, as an error or warning indicator, as an indication that a request for an input has been made by the operating system or an application, and so forth. It is to be appreciated that the pre-specified audio sequence may only include the necessary frequencies described above, or may include other frequencies in addition to the necessary frequencies, so as to mask the training nature of the audio sequence.

The present invention may be implemented on, but is not limited to, a Personal Computer (PC), a portable computing device (e.g., laptop computer, Personal Digital Assistant (PDA), etc.), an advanced multipurpose phone, and so forth. The audio applications include, but are not limited to, streaming audio, Moving Picture Experts Group Layer-3 Audio (MP3), Compact Disk (CD) playback, Digital Versatile Disk (DVD) playback, radio, video games having audio associated therewith, and so forth.

It is to be appreciated that the phrases "audio applications" and "non-training audio applications" are used interchangeably herein to refer to any applications that, at the least, include audio (that is, have an audio output) and that have not been designed solely for the purpose of training an acoustic echo canceller, but rather are designed for entertainment (e.g., music, multimedia, etc.) or other purposes. These types of audio applications, while not designed solely for the purpose of training an acoustic audio canceller, are employed in accordance with the present invention to train the echo canceller in the background so as to minimize or completely eliminate the above and other identified problems of prior art training methods for acoustic echo cancellers. Thus, an application that includes both audio and video (e.g., the playback of a DVD) may be used to train the echo canceller in accordance with the present invention. Moreover, even a specially designed audio sound or sequence that includes all of the frequencies necessary to train the acoustic canceller may also be used in accordance with the present invention, when such specially designed audio sound or sequence is employed for some other non-training purpose such as providing an indication to a user of some event (e.g., incoming call, e-mail, upcoming teleconference or videoconference, a warning, an error, and so forth).

The use of the audio applications for training the echo canceller keeps the echo canceller trained for the environment in which the echo canceller is implemented, keeping the echo canceller always ready for bi-directional communication applications such as conferencing and telephony. Thus, the present invention advantageously masks the training of the echo canceller by utilizing, e.g., the multimedia that is played back on the platform/electronic device that also includes the echo canceller.

It is to be understood that the present invention may be implemented in various forms of hardware, software, firmware, special purpose processors, or a combination thereof. Preferably, the present invention is implemented as a combination of hardware and software. Moreover, the software may be implemented as an application program or device driver tangibly embodied on a program storage device. The application program or device driver may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code, part of the application program, or part of the device driver (or a combination thereof) that is executed via the operating system. In addition, various other peripheral devices may be connected to the computer platform such as an additional data storage device and a printing device. It is to be appreciated that the device driver would be applicable to an audio card, with the device driver stored on a memory device that is part of the audio card. In such a case, the echo canceller would utilize an audio card for input and output such as that shown and described below with respect to FIG. 1. Otherwise, the echo canceller may be implemented in hardware on, for example, a personal computer such as that shown and described below with respect to FIG. 1, or on a peripheral device coupled to a personal computer via a Universal Serial Bus (USB) interface such as that shown and described below with respect to FIG. 9.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

FIG. 1 is a block diagram illustrating an electronic device 100 to which the present invention may be applied, according to an illustrative embodiment of the present invention. The electronic device 100 is capable of implementing telephony and conferencing application and is also capable of implementing audio applications. The electronic device 100 in which the present invention is implemented may be, but is not limited to, a Personal Computer (PC), a portable computing device (e.g., laptop computer, Personal Digital Assistant (PDA), etc.), an advanced multipurpose phone, and so forth.

The electronic device 100 includes at least one processor (CPU) 102 operatively coupled to other components via a system bus 104. A read only memory (ROM) 106, a random access memory (RAM) 108, a display adapter 110, an I/O adapter 112, a user interface adapter 114, a sound adapter (also referred to herein as an "audio card") 199, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A user interface 120 is operatively coupled to system bus 104 by user interface adapter 114. The user interface 120 is used to input and output information to and from electronic device 100. The user interface 120 may be, e.g., mouse, keyboard, touchpad, and so forth.

At least one speaker (hereinafter "speaker") 150 and at least one microphone (hereinafter "microphone") 151 are operatively coupled to an echo canceller 152. The speaker 150, the microphone 151, and the echo canceller 152 are operatively coupled to the system bus 104 by sound adapter 199. While shown as a distinct and separate element in FIG. 1, it is to be appreciated that the echo canceller 152 may be implemented in hardware, software, or any combination thereof, as noted above with respect to the present invention. Accordingly, in other embodiments of the present invention, the echo canceller may be resident, in whole or in part, in a system memory device such as disk storage device 118, RAM 108, and so forth.

A (digital and/or analog) modem 196 is operatively coupled to system bus 104 by network adapter 198. The preceding arrangement of a modem 196 coupled to system bus 104 by network adapter 198 is directed to an external modem. In the case of an internal modem, then the modem would be directly coupled to system bus 104 without the need for network adapter 198.

The electronic device 100 further includes buffers 171 that are included in RAM 108 and also buffers 172 that are included in the sound adapter 199.

Figure 2:
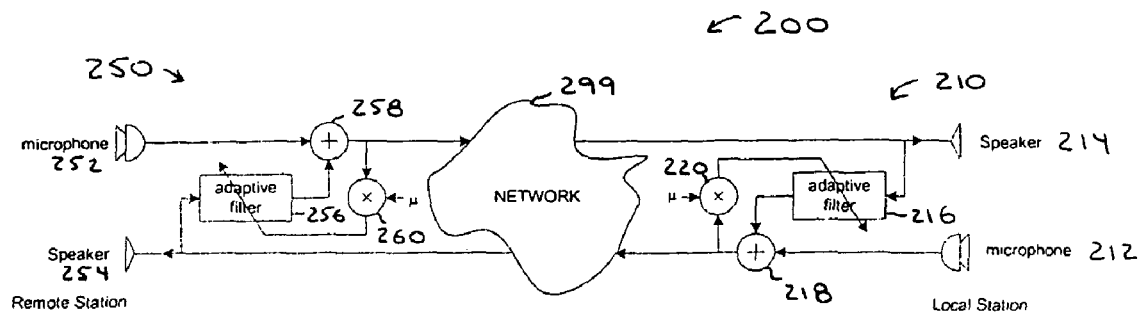
FIG. 2 is a block diagram illustrating an acoustic echo canceller system 200 to which the present invention may be applied, according to an illustrative embodiment of the present invention.

An acoustic echo canceller to which the present invention may be applied is inserted in the audio input path of the device that is to be used in a "full-duplex speakerphone" mode of operation. FIG. 2 is a block diagram illustrating an acoustic echo canceller system 200 to which the present invention may be applied, according to an illustrative embodiment of the present invention.

The acoustic echo canceller system 200 includes a local station 210 and a remote station 250 connected through a network 299. Conferencing and/or telephony may be conducted between parties located at the local station 210 and the remote station 250.

The local station 210 includes a microphone 212, a speaker 214, an adaptive filter 216, an adder 218 and a multiplier 220. The remote station 250 includes a microphone 252, a speaker 254, an adaptive filter 256, an adder 258 and a multiplier 260.

FIGS. 3A, 3B, and 3C are diagrams illustrating acoustic echo paths 320 relating to the feedback of a speaker output to a microphone input in a personal computer 399, a mobile computer 398 (e.g., laptop), and a Personal Digital Assistant (PDA) 397, respectively. The AEPs 320 may affect any number of devices including, but not limited to, the personal computer 399, the mobile computer 398, and the PDA 397 shown in FIGS. 3A, 3B, and 3C.

Figure 4:
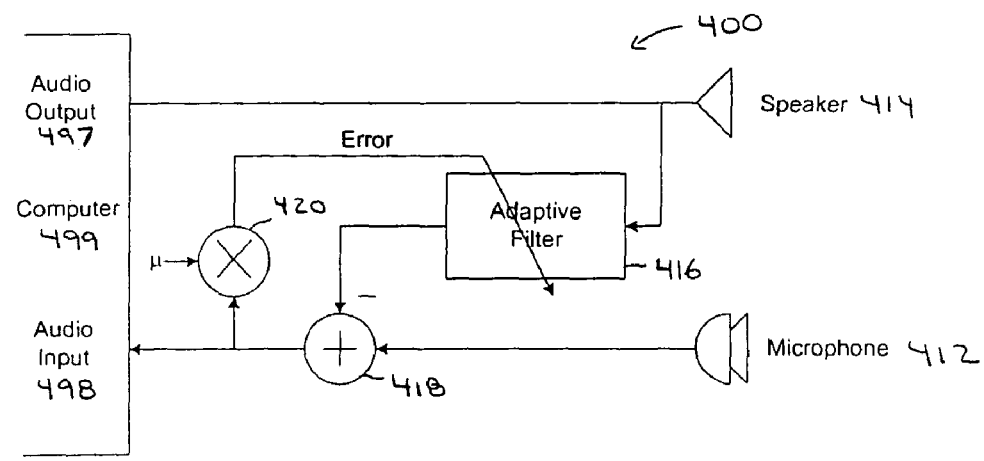
FIG. 4 is a block diagram illustrating an acoustic echo canceller 400 to which the present invention may be applied, according to another illustrative embodiment of the present invention.

FIG. 4 is a block diagram illustrating an acoustic echo canceller 400 to which the present invention may be applied, according to another illustrative embodiment of the present invention. The acoustic echo canceller 400 is inserted between the speaker 414 and microphone 412 of a personal computer 499 having and audio input 498 and an audio output 497. The acoustic echo canceller 400 includes an adaptive filter 416, an adder 418 and a multiplier 420.

An audio output of the personal computer 499 is input to the speaker 414 and to the adaptive filter 416. An output of the microphone 412 and an output of the adaptive filter 416 are input to the adder 418. The output of the adder 418 is input to the multiplier 420 and to an audio input of the personal computer 499. An adaptation rate control u is also input to the multiplier 420. The output of the multiplier 420 (i.e., an error signal) is input to the adaptive filter 416 for use in minimizing or eliminating the acoustic echo.

The adaptation rate control u is nominally a small value, typically less than $\frac{1}{100}$ the magnitude of the filter signal. Reducing u increases the time it takes for the adaptive filter to adapt, with the benefit of more accurately canceling the echo. However, the echo condition is often time varying, and it is necessary to adapt relatively quickly to cancel the time-varying echo. A maximum value of u can be estimated using known techniques.

Figure 5:
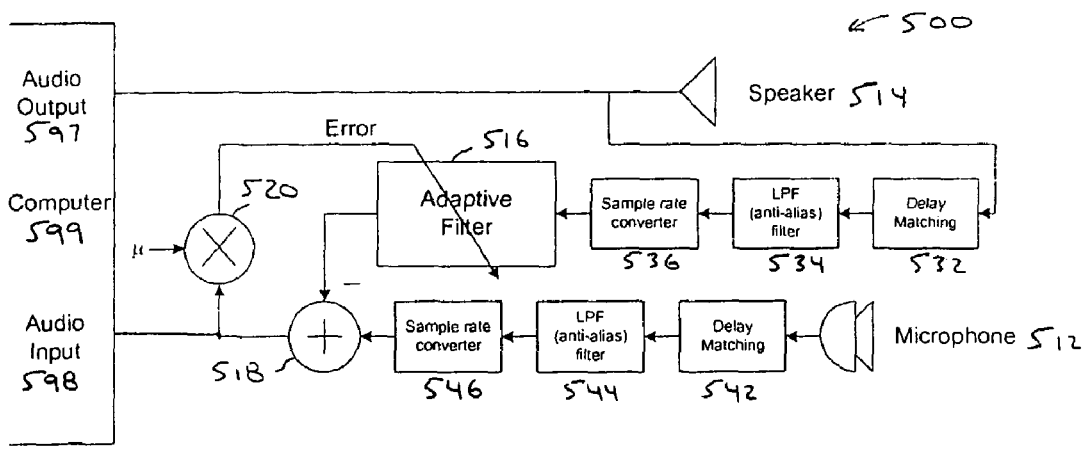
FIG. 5 is a block diagram illustrating an acoustic echo canceller 500 to which the present invention may be applied, according to yet another illustrative embodiment of the present invention.

FIG. 5 is a block diagram illustrating an acoustic echo canceller 500 to which the present invention may be applied, according to yet another illustrative embodiment of the present invention. The acoustic echo canceller 500 is inserted between the speaker 514 and microphone 512 of a personal computer 599 having and audio input 598 and an audio output 597. The acoustic echo canceller 500 is capable of operation with different audio sample rates. The acoustic echo canceller 500 includes an adaptive filter 516, an adder 518, a multiplier 520, a first delay matching buffer 532, a first Low Pass Filter (LPF) 534, a first sample rate converter 536, a second delay matching buffer 542, a second Low Pass Filter (LPF) 544, and a second sample rate converter 546.

The first LPF 534 and the second LPF 544 are used for anti-aliasing.

The first sample rate converter 536 and the second sample rate converter 546 are utilized to perform sample rate conversion to match the entertainment sample rates (typically 44.1 or 48 Ksps) to the communication sample rate (typically 8 Ksps). The first LPF 534 and the second LPF 544 are utilized to preserve only the audio communication bandwidth. The audio communication bandwidth corresponds to audio conferencing and telephony and may be, but is not limited to, 300 Hz to 3.3 KHz. Echo canceling over this bandwidth in accordance with the present invention will save processing power. For example, by processing at a lower sample rate, each sample covers more time, fewer taps are required in the adaptive filter to cover the desired time span, and more time is available to compute the results of the adaptive filter. In a system in which the acoustic echo canceller 500 shown in FIG. 5 is to be applied, Analog-to-Digital Conversion (ADC) and Digital-to-Analog Conversion (DAC) are performed by the sample rate converters 536 and 546 at high sample rates for entertainment quality audio, but for communication applications (conferencing and telephony), standard 8 ksps audio sampling may be employed.

The first delay matching buffer 532 and the second delay matching buffer 542 are utilized to match buffer delays at the different sample rates. The buffers that are to be matched by the first delay matching buffer 532 and the second delay matching buffer 542 may be, for example, software buffers (e.g., buffers 171) and/or hardware buffers (e.g., 172) as described herein.

Since the computer or other electronic device to which the present invention is applied would not necessarily always be used for video or conferencing, other applications would not need the echo canceller. If the echo canceller were active during the operation of applications that produce an audio output, the echo canceller would be maintained in a trained state, ready for the next bi-directional audio communication application.

Since simple LMS (Least Mean Squared) adaptive filter based echo cancellers use a fair amount of processing power, the background training would not need to operate continuously, being activated occasionally to keep the adaptive filter coefficients (echo profile) up to date, but not continuously as to become a burden to the system processor. For example, idle cycles of the processor can be used to train the echo canceller whenever the speaker of the computer is used, whether in video games, playing MP3s, CDs, or other audio files, playing video files, or even during the typical bells and whistles of the PC alerting the user to emails and other warnings.

Since in MICROSOFT WINDOWS and other non-real-time operating systems audio is implemented by buffering data to the speakers and from the microphone, the system will operate in bursts, as instructed by the operating system, processing buffers full of data. Filter coefficient adaptation would proceed as described and illustrated with respect to FIG. 6.

Figure 8:
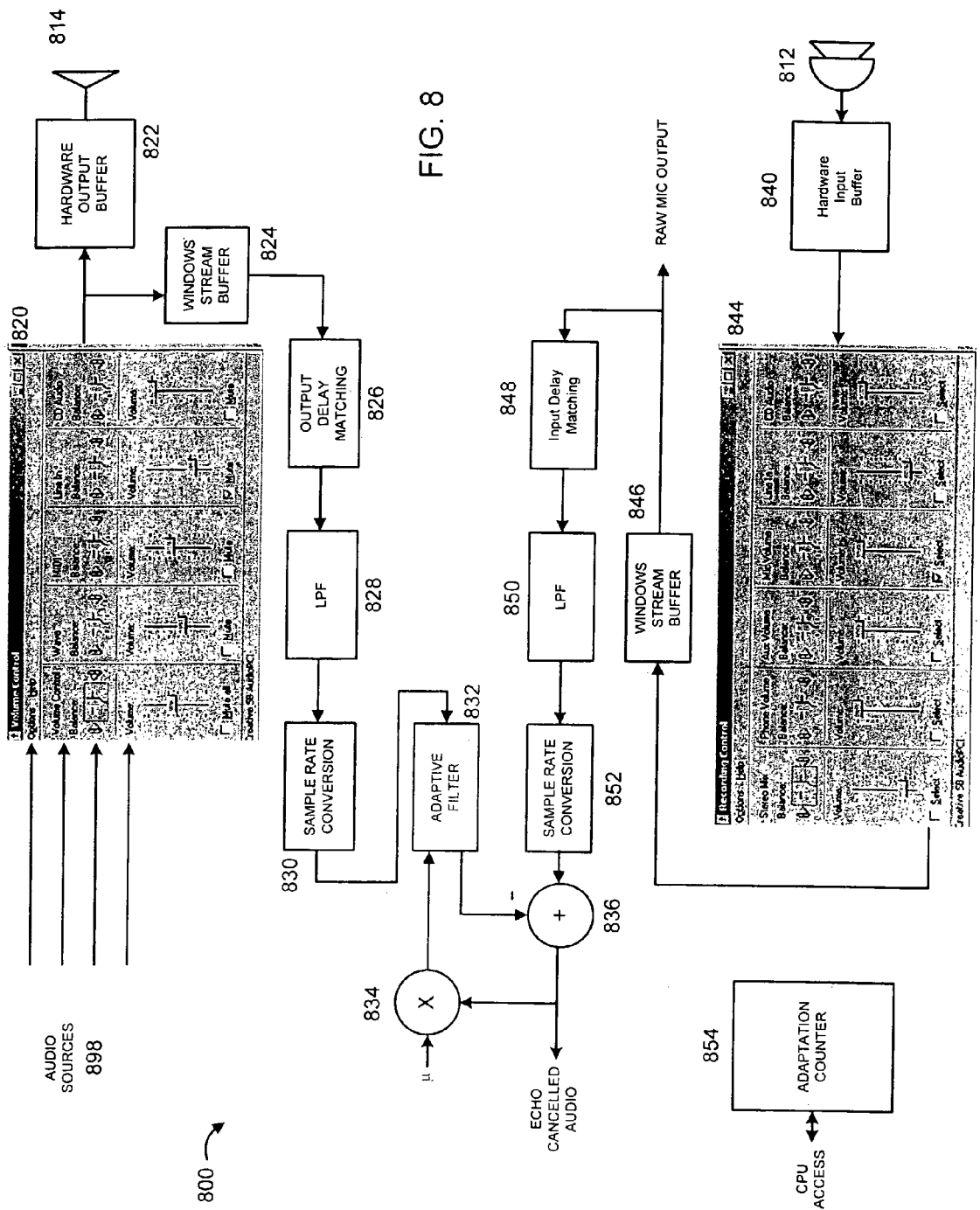
FIG. 8 is a block diagram illustrating an acoustic echo canceller 800 to which the present invention may be applied, according to still yet another illustrative embodiment of the present invention.

FIG. 8 is a block diagram illustrating an acoustic echo canceller 800 to which the present invention may be applied, according to still yet another illustrative embodiment of the present invention. The acoustic echo canceller 800 is inserted between the speaker 814 and microphone 812 of a personal computer having a plurality of audio sources 898. Data flow is as shown in FIG. 8.

A playback volume control user interface 820 is capable of controlling the playback volumes of the plurality of audio sources 898. It is to be appreciated that any stream buffer delays induced prior to the plurality of audio sources 898 being input to the playback volume control user interface 820 do not apply to the echo cancellation problem. The playback volume control user interface 820 is coupled to a hardware output buffer 822 and to a WINDOWS stream buffer 824. The hardware output buffer 822 is also coupled to the speaker 814. The WINDOWS stream buffer 824 is coupled to an output delay matching buffer 826 that, in turn, is coupled to a Low Pass Filter (LPF) 828. The LPF 828 is coupled to a sample rate conversion device 830 that, in turn, is coupled to an adaptive filter 832. The adaptive filter 832 is coupled to a multiplier 834 and an adder 836. The multiplier 834 is also coupled directly to the adder 836.

The microphone 812 is coupled to a hardware input buffer 840 that, in turn, is coupled to a recording control user interface 844. The recording control user interface 844 is coupled to a WINDOWS stream buffer 846 that, in turn, is coupled to an input delay matching buffer 848. The input delay matching buffer 848 is coupled to a Low Pass Filter (LPF) 850 that, in turn, is coupled to a sample rate conversion device 852. The sample rate conversion device 852 is also coupled to the adder 826.

An adaptive counter 854 is accessible by a processor (not shown) of the system in which the present invention is applied. The adaptive counter 854 may be, but is not limited to, a register or memory location. The adaptive counter 854 is used to limit background processing when training the acoustic echo canceller.

That is, the adaptive counter 854 provides a way to reduce the adaptation rate of the adaptive filter. If the processor has a high processor load, then the echo canceling adaptation task can lighten the processor load by only adapting on every other call to the echo canceling adaptation task, or by whatever ratio is set by the adaptive counter 854. The adaptive counter 854 is further described below with respect to the method of FIG. 6.

It is presumed, but not necessary, that the system to which the acoustic echo canceller 800 is to be applied includes a sound card. In the case that the present invention is applied to a system having a sound card, buffers (e.g., WINDOWS stream buffers 824 and 846) are used to couple streams of samples to and from the sound card. The buffers in this case are software structures (e.g., such as buffer 171 shown in FIG. 1) that store enough samples so that WINDOWS applications can fill/empty a buffer without the buffer running out or overfilling between OS task switches. Also, there are hardware buffers on the sound card (e.g., such as buffer 172 shown in FIG. 1) for audio playback or capture (from the microphone). The buffer delays can be significant in the WINDOWS environment. Thus, the delay of the adaptive filter 832 needs to be adjusted to span the acoustic echo delay range, without the need for incorporating the buffer delays in the delay span of the adaptive filter 832. To handle up to 100 ms of echo, an absolute minimum of 800 taps are needed at 8 Ksps. More taps would be provided (e.g., 1024 taps) so that each echo can be a filter to match the phase, amplitude, and general frequency response of each echo path.

In a system where the WINDOWS buffers (e.g., such as buffer 171 shown in FIG. 1) and the hardware input buffers and hardware output buffers (e.g., such as buffer 172 shown in FIG. 1) are identical, then the delay matching buffers (e.g., buffers 826 and 846) would be non-existent. However, the delaying matching buffers 826 and 846 are included in FIG. 8 so that the path from the speaker 814 back to the adaptive filter 832 has the same delay as the path from the microphone 812 back to the adaptive filter 832.

Figure 6:
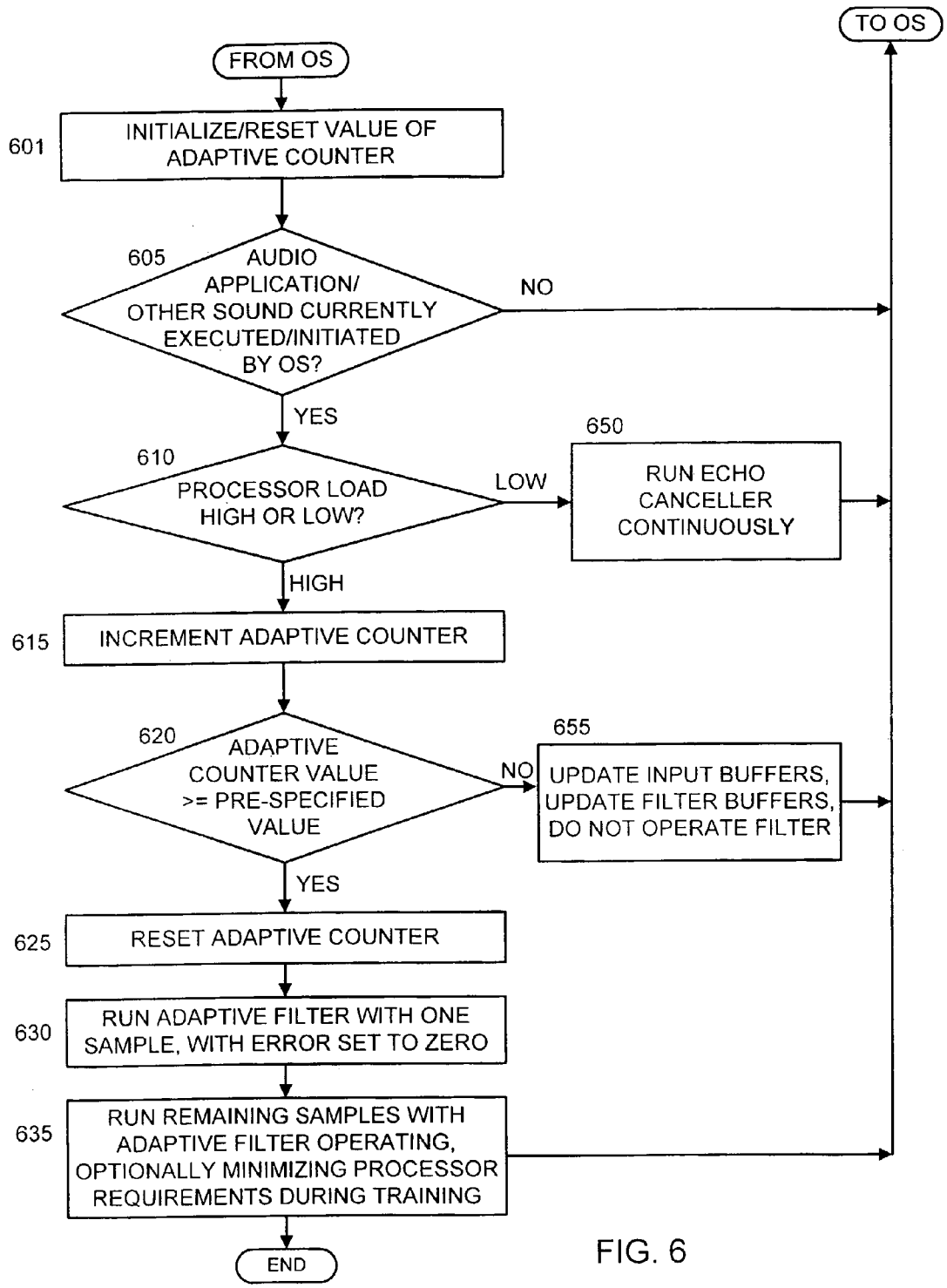
FIG. 6 is a flow diagram illustrating a background training method for a teleconferencing or telephony echo canceller, according to an illustrative embodiment of the present invention.

FIG. 6 is a flow diagram illustrating a background training method for a teleconferencing or telephony echo canceller, according to an illustrative embodiment of the present invention.

The value of an adaptive counter is initialized/reset to zero (step 601).

Adaptation and filtering are only practical when audio is coming out of the system. Either an audio application must be running, or the Operating System (OS) must generate a sound. Thus, it is determined whether an audio application is currently being executed by the OS or whether the playing of a sound is being initiated by the OS (step 605). If so, the method proceeds to step 610. Otherwise, a return is made to the operating system. It is to be appreciated that the sound may be, but is not limited to, a sound relating the arrival of an e-mail, an indication sound of some event (e.g., a notification of an incoming call, a conference call reminder, a warning, etc.), and even a pre-specified sound sequence also used for a purpose other than solely training the echo canceller.

Depending on the average processor load, different approaches can be taken to adapt the echo canceller filter. Thus, at step 610, it is determined whether the average processor load is low or high. If the average processor load is low, then the echo canceller can operate continuously, using all audio samples (step 650), and then a return is made to the operating system. Otherwise, if the average processor load is high, then the filter is adapted intermittently. To adapt the filter intermittently, a counter (hereinafter "adaptive counter") is used, and a value of the adaptive counter is incremented (step 615). It is to be appreciated that the present invention is not limited to the use of a counter to intermittently adapt the adaptive filter and, thus, other approaches may also be employed while maintaining the spirit of the present invention.

Adaptation and filtering are only completed during every adapt call to the method/routine of FIG. 6. Otherwise, data is only stored in the filter input buffers (but adaptation is not performed), reducing the computational load from 2n operations per sample to one operation per sample, where n is the number of taps in the filter, given a full-band LMS echo canceller.

Thus, it is determined whether the value of the adaptive counter is greater than or equal to a pre-specified adaptive counter comparison value (step 620). If so, then the value of the adaptive counter is reset (to zero) (step 625), and the method proceeds to step 630. Otherwise the input buffers and the adaptive filter buffers are updated, but the adaptive filter is not operated (step 655), and a return is made to the operating system.

It is to be appreciated that the adaptive counter comparison value may be changed as desired, and need not be a permanent setting. If the adaptive counter comparison value were set to 0, then the adaptive filter would adapt all of the time. If the adaptive counter comparison value were set to 1, every other call to the echo canceller program would adapt the adaptive filter. If the adaptive counter comparison value were set to 2, 1 in 3 calls would adapt the adaptive filter, and so on.

At step 630, the adaptive filter is run with one sample, with the error set to zero. The remaining samples are then run with the adaptive filter operating, optionally performing operations to minimize processor requirements during training (step 635), and a return is made to the operating system.

A brief description will now be given of a methodology to minimize processor requirements for background training. One way to minimize processor requirements for background training is based on the fact that the only necessary operation for such training is to keep the adaptive filter filled with data going to the speaker. Since filters are typically handled as a circular buffer, all that is required is that each new sample is written in the filter buffer. The microphone active is kept active and microphone samples are fed into a buffer. When the CPU is available, a burst of filter outputs is computed so that adaptation is enabled. The adaptive filter output is subtracted from the microphone signal, and the error is computed to adapt the filter. Adaptation would be inhibited for the first filter output, since the previous error would not correlate with the filter state, since the filter was idle while the processor was busy. Intermittent operation is permissible, since the filter is operated only to adapt the coefficients. What the microphone hears is not being used in communications when entertainment applications are running.

The present invention may be implemented in other echo canceller architectures such as, for example, subband and transform approaches to echo cancellation, where a subband or transform based echo canceller would be substituted for the full band echo canceller described above. Alternate adaptive filter algorithms could also be used, such as normalized Least Mean Square (LMS), Affine Projection LMS, and Recursive Least Squares (RLS) algorithms. Finally, the algorithm could be applied to both right and left speakers, even with multiple microphones, in a stereo application (see FIG. 7). Delays, filter and sample rate converters could be added as in FIG. 5.

Figure 7:
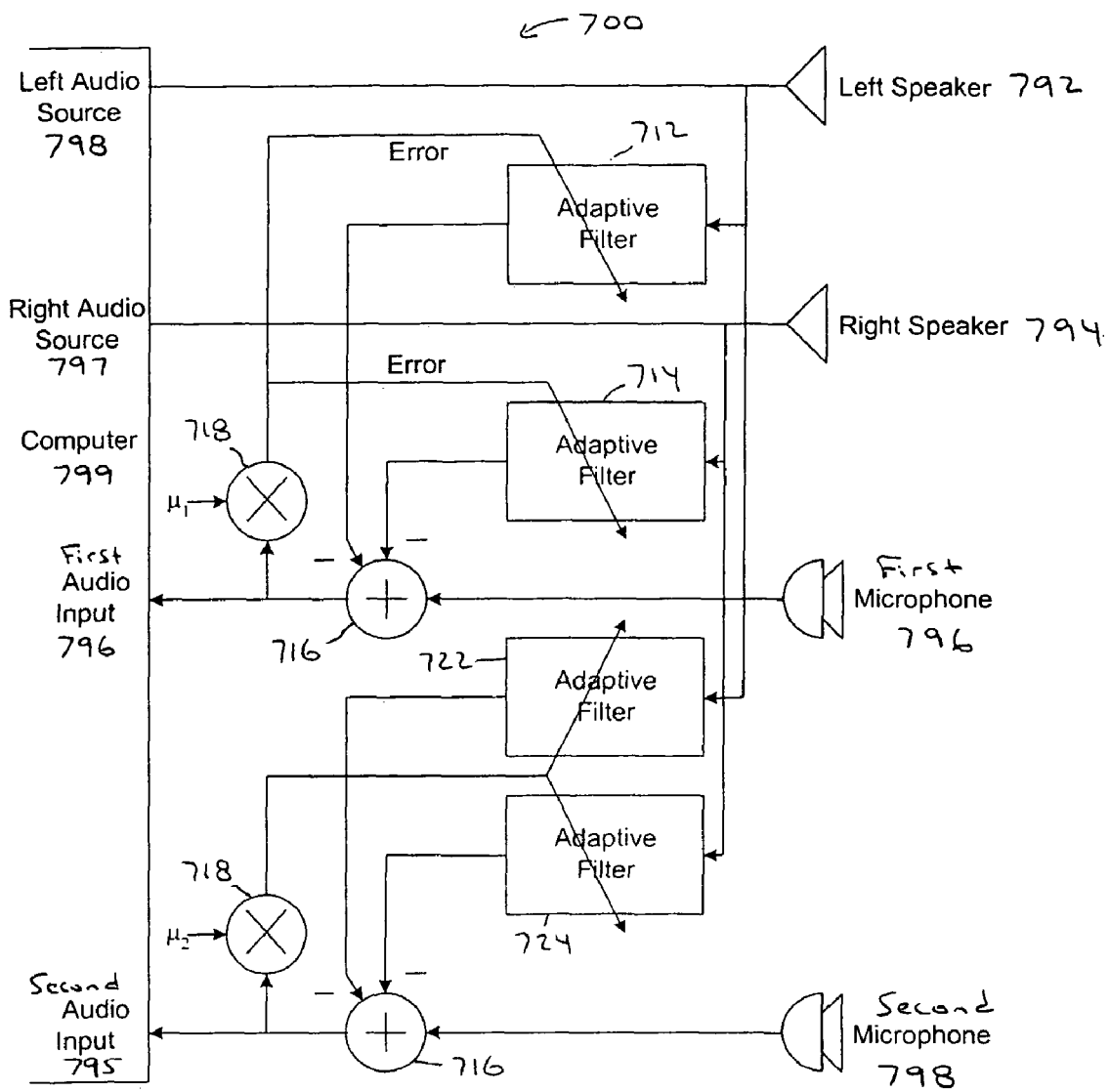
FIG. 7 is a block diagram illustrating a stereo acoustic echo canceller 700 to which the present invention may be applied, according to an illustrative embodiment of the present invention.

FIG. 7 is a block diagram illustrating a stereo acoustic echo canceller 700 to which the present invention may be applied, according to an illustrative embodiment of the present invention. The stereo acoustic echo canceller 700 is inserted between the speakers (left speaker 792 and right speaker 794) and microphones (first microphone 796 and second microphone 798) of a personal computer 799. The personal computer 799 includes a left audio source output 798, a right audio source output 797, a first audio input 796, and a second audio input 795.

The stereo acoustic echo canceller 700 includes a first adaptive filter 712, a second adaptive filter 714, a first adder 716 and a first multiplier 718. The stereo acoustic echo canceller 700 further includes a third adaptive filter 722, a fourth adaptive filter 724, a second adder 716 and a second multiplier 718.

Figure 9:
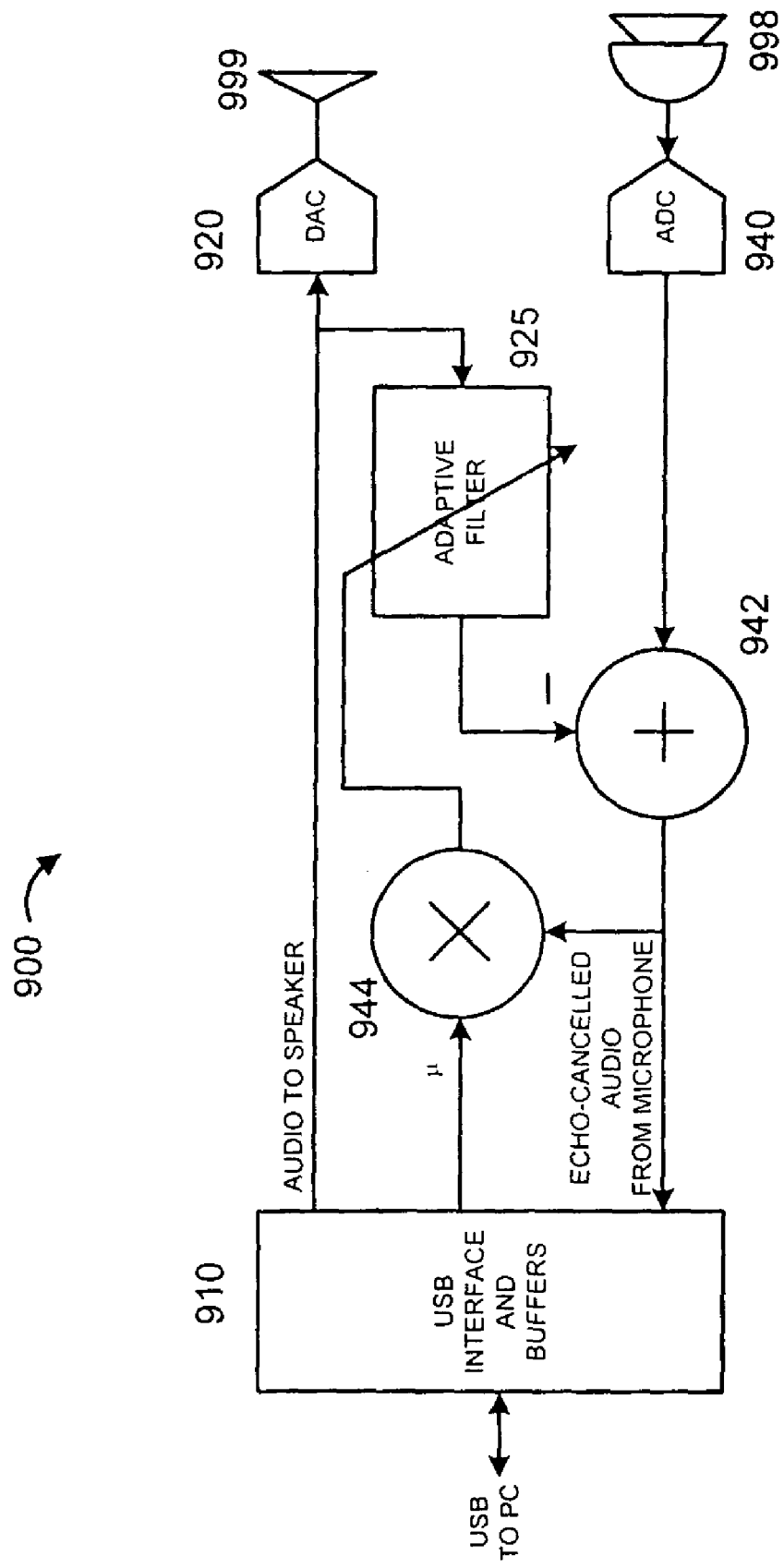
FIG. 9 is a block diagram illustrating an acoustic echo canceller 900 to which the present invention may be applied, according to a further illustrative embodiment of the present invention.

FIG. 9 is a block diagram illustrating an acoustic echo canceller 900 to which the present invention may be applied, according to a further illustrative embodiment of the present invention. The acoustic echo canceller 900 is inserted between the speaker 999 and microphone 998 of a peripheral device having a Universal Serial Bus (USB) interface and buffers (hereinafter also collectively referred to as "USB interface") 920 for connecting to a Personal Computer (PC) and so forth.

Audio from the PC is output from the USB interface 910 and is input to a Digital-to-Analog Converter (DAC) 920 and to an adaptive filter 925. The analog audio is then output from the speaker 999.

Audio is input to the microphone 998 that converts acoustic energy to an analog electrical signal that is, in turn, converted to a digital signal by an Analog-to-Digital Conversion (ADC) 940

The digital signal output from the ADC 940 and an output of the adaptive filter 925 are input to an adder 942. Outputs of the adder 942 (i.e., echo-cancelled audio from the microphone 998) are input to the USB interface 910 and to a multiplier 944. The multiplier 944 also receives as an input an adaptation rate control u. The output of the multiplier 944 is input to the adaptive filter 925.

It is to be appreciated that the embodiment of FIG. 9 allows a peripheral device having an acoustic echo canceller included therein to perform echo canceling functions so as to free up the processor on the computer to which the peripheral device is attached via the USB interface.

It is to be further appreciated that while the illustrative embodiment of FIG. 9 is shown and described with respect to a USB interface, other types of interfaces may also be employed in accordance with the present invention including, but not limited to, an IEEE 1394 FIREWIRE interface.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A method comprising:
    implementing a telecommunications application of an electronic device, said electronic device comprising a first personal computer;
    sampling a telecommunications signal of said telecommunications application at a first sampling rate; and
    utilizing sound output of an entertainment sound adapter of said electronic device, said entertainment sound adapter output being sampled at a second higher sampling rate than said first sampling rate, said entertainment sound adapter output corresponding to a non-training audio application of said electronic device to train an acoustic echo canceller in a background of said telecommunications application so long as a processing load on said processor of said electronic device is less than an average load of said processor of said electronic device.

2. The method of claim 1, wherein the non-training audio application is an entertainment application, said entertainment sound adapter output includes program audio, and said entertainment application was not designed solely for training the acoustic echo canceller.

3. The method of claim 2, wherein the entertainment sound adapter output comprising said program audio of the entertainment application corresponds to streaming audio sound.

4. The method of claim 1, wherein the electronic device is said first personal computer and said non-training audio application of said electronic device comprises an entertainment application of said first personal computer.

5. The method of claim 1, wherein utilizing comprises performing sample rate conversion to match the second higher sampling rate of the non-training audio application with the first sampling rate of the telecommunications application.

6. The method of claim 1, wherein said electronic device includes a microphone and a speaker, the acoustic echo canceller includes an adaptive filter, a first path is formed from the speaker to the adaptive filter and a second path is formed from the microphone to the adaptive filter, and said utilizing comprises matching a delay of the first path with a delay of the second path.

7. The method of claim 6, wherein said electronic device includes a processor, and utilizing further comprises minimizing use of the processor when a current load of the processor is above an average load threshold for the processor.

8. The method of claim 7, wherein said minimizing comprises collecting audio data samples from one of the microphone and the speaker and restricting use of the adaptive filter until the current load of the processor is below the average load threshold for the processor.

9. The method of claim 8, wherein restricting comprises:
utilizing an adaptive counter to count a number of training calls to the acoustic echo canceller; and
training the adaptive filter only when the number of training calls is greater than an adaptive filter comparison threshold.

10. A method comprising:
utilizing sound output of a sound adapter of an electronic device comprising a first personal computer, said sound adapter output comprising audio that corresponds to a non-training audio application of said electronic device, said sound adapter output being utilized for training an acoustic echo canceller of said electronic device in a background of a telecommunications application of said electronic device so long as a processing load on said processor of said electronic device is less than an average load of said processor of said electronic device, wherein the sound adapter output that corresponds to the non-training audio application of said electronic device is a notification of an event unrelated to training of the acoustic echo canceller and comprises a sequence of frequencies including frequencies to train the acoustic echo canceller.

11. The method of claim 10, wherein the event is one of an incoming call, an incoming e-mail message, an upcoming conference, an upcoming meeting, an error, a warning, and a request for input.

12. An acoustic echo canceller comprising:
an entertainment sound adapter of an electronic device, said electronic device comprising one of a first personal computer and a peripheral device for use with a second personal computer, said electronic device having a telecommunications application involving sound sampled at a first sampling rate, and
an adaptive filter adapted to be trained using sound comprising audio output of said entertainment sound adapter of said electronic device sampled at a second higher sampling rate, wherein said audio output of said entertainment sound adapter corresponds to a non-training audio application for training said adaptive filter in a background of said telecommunications application so long as a processing load on said processor of said electronic device is less than an average load of said processor of said electronic device.

13. The acoustic echo canceller of claim 12, wherein the non-training audio application is an application that includes program audio, and was not designed solely for training the acoustic echo canceller.

14. The acoustic echo canceller of claim 13, wherein the non-training audio application comprising said program audio corresponds to streaming audio and said non-training audio application comprises an entertainment application of said electronic device different from said telecommunications application of said electronic device.

15. The acoustic echo canceller of claim 12, wherein the electronic device is said first personal computer.

16. The acoustic echo canceller of claim 12, further comprising a sample rate conversion device for performing sample rate conversion to match the second higher sampling rate of the non-training audio application with the first sampling rate of the telecommunications application, said telecommunications application being different from said non-training audio application of said electronic device.

17. The acoustic echo canceller of claim 12, wherein the electronic device includes a microphone and a speaker, a first path is formed from the speaker to the adaptive filter and a second path is formed from the microphone to the adaptive filter, and the acoustic echo canceller further comprises a delay matching buffer for matching a delay of the first path with a delay of the second path.

18. The acoustic echo canceller of claim 12, wherein said electronic device includes a processor, and the acoustic echo canceller further comprises means for minimizing use of the processor when a current load of the processor is above an average load threshold of the processor.

19. The acoustic echo canceller of claim 18, wherein the electronic device includes a microphone and a speaker, the acoustic echo canceller further comprises:
means for collecting audio data samples from one of the microphone and the speaker; and
means for restricting use of the adaptive filter until the current load of the processor is below the average load threshold of the processor.

20. The acoustic echo canceller of claim 19, wherein said means for restricting comprises:
an adaptive counter for counting a number of training calls to the acoustic echo canceller;
means for comparing the number of training calls to an adaptive filter comparison threshold, and
wherein the adaptive filter is trained only when the number of training calls is greater than the adaptive filter comparison threshold.

21. An acoustic echo canceller comprising:
an adaptive filter adapted to be trained so long as a processing load on said processor of said electronic device is less than an average load of said processor of said electronic device using sound comprising audio that corresponds to a non-training audio application; and
a sound adapter of an electronic device coupled to said adaptive filter for outputting audio sound of said non-training audio application;
wherein the output audio sound that corresponds to the non-training audio application is a notification of an event unrelated to training of the acoustic echo canceller and comprises a sequence of frequencies including frequencies to train the acoustic echo canceller.

22. The acoustic echo canceller of claim 21, wherein the event is one of an incoming call, an incoming e-mail message, an upcoming conference, an upcoming meeting, an error, a warning, and a request for an input.

23. A method comprising:
implementing a telecommunications application of a computer having a telecommunications signal sampled at a first sampling rate;
receiving sound output of an entertainment sound adapter from the computer at an acoustic echo canceller in a peripheral device of said computer via one of a USB interface and an IEEE 1394 interface between said computer and said peripheral device, the entertainment sound adapter output corresponding to a non-training audio application, said entertainment sound adapter output being sampled at a second sampling rate, said second sampling rate being higher than said first sampling rate;
utilizing the entertainment sound adapter output that corresponds to the non-training audio application to train the acoustic echo canceller in the peripheral device in a background of said telecommunications application so long as a processing load on said processor of said electronic device is less than an average load of said processor of said electronic device; and
performing echo canceling, during the telecommunications application implemented by the computer, using the acoustic echo canceller in the peripheral device.

24. The method of claim 23, wherein the non-training audio application is an entertainment application that includes program audio, and was not designed solely for training the acoustic echo canceller.

25. The method of claim 23, wherein the entertainment sound adapter output that corresponds to the non-training audio application is a notification of an event unrelated to training of the acoustic echo canceller and comprises a sequence of frequencies including frequencies to train the acoustic echo canceller.

26. The method of claim 25, wherein the event is one of an incoming call, an incoming e-mail message, an upcoming conference, an upcoming meeting, an error, a warning, and a request for an input.

27. The method of claim 1, wherein said second sampling rate is greater than 30 ksps and said first sampling rate is less than 20 ksps.

* * * * *